Figure 1:
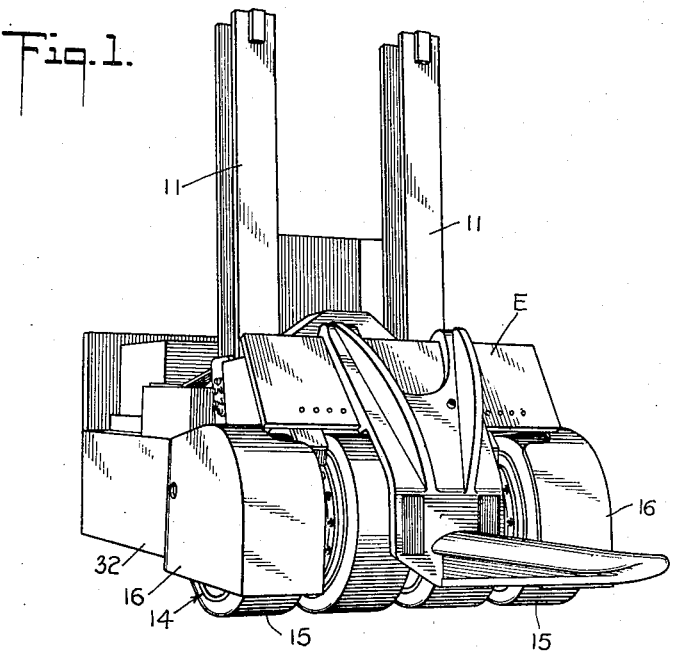

July 31, 1951  B. I. ULINSKI  2,562,835
BRAKING FENDER
Filed April 21, 1948  2 Sheets-Sheet 1

Inventor
B. I. Ulinski
By
A. H. Golden
Attorney

July 31, 1951
B. I. ULINSKI
2,562,835
BRAKING FENDER
Filed April 21, 1948
2 Sheets-Sheet 2
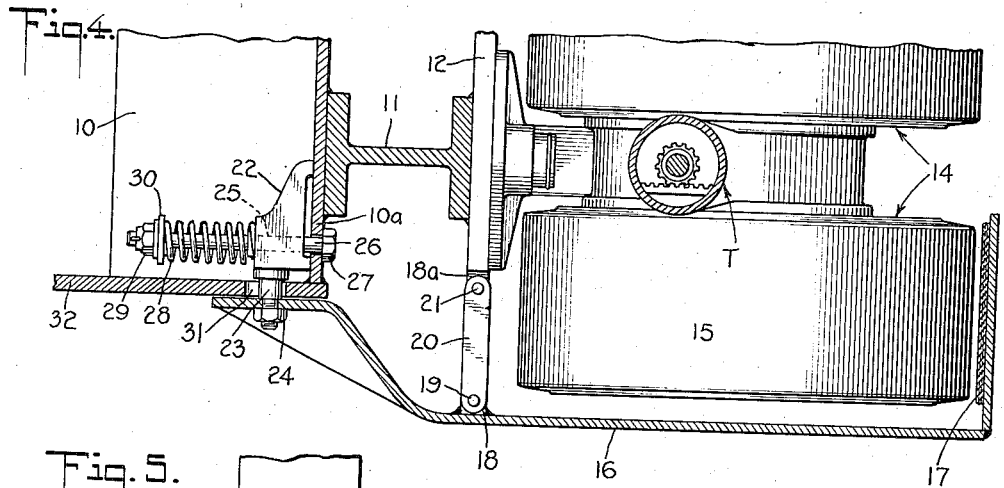
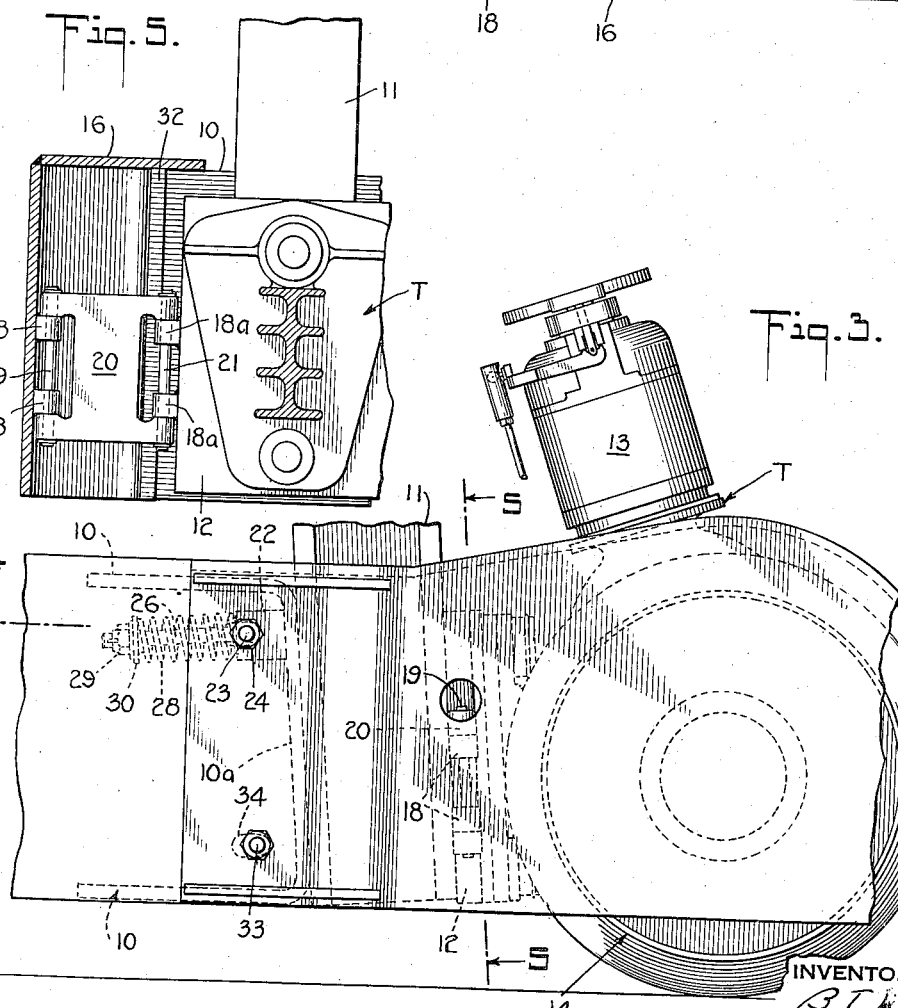
INVENTOR
B. I. Ulinski
BY
J. H. Golden
ATTORNEY Patented July 31, 1951

2,562,835

UNITED STATES PATENT OFFICE 2,562,835

BRAKING FENDER

Bronislaus I. Ulinski, Chicago, Ill., assignor to The Yale & Towne Manufacturing Company, Stamford, Conn., a corporation of Connecticut Application April 21, 1948, Serial No. 22,318

4 Claims. (Cl. 188—2)

This application relates to an electric industrial truck, and more particularly to a truck of the class set forth in my application Serial No. 439, filed January 3, 1948.

In my earlier application I show and describe a truck adapted for handling extremely heavy loads never before manipulated by trucks of the particular class. While I have equipped my truck with extremely effective brakes, all as is set forth in my earlier application, I do recognize that the truck will have considerable momentum even at low speeds because of its great weight and the great weight of the loads it handles, so that it will be extremely difficult to stop the truck in a short distance. Because industrial trucks must be handled in narrow aisles and must move loads frequently into position between other loads in a warehouse, it is absolutely essential to brake the truck sharply; as for example, where the truck is required to "inch" a load forward into some precise position.

I have conceived and developed fenders for certain of the wheels of my truck, these fenders being adapted for movement upon encountering an obstruction so as to apply a braking surface directly to the cylindrical periphery of the tires on the wheels of the truck. Those skilled in the art will fully appreciate that while bumpers have been used on trucks of the class described, fenders have never been applied or found necessary, so that my invention forms a rather distinct departure from the general trend of the art of industrial trucks, both as to the use of a fender per se, and the employment of the fender for the purpose of braking the wheels by application directly against the tires of the wheels.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 2:
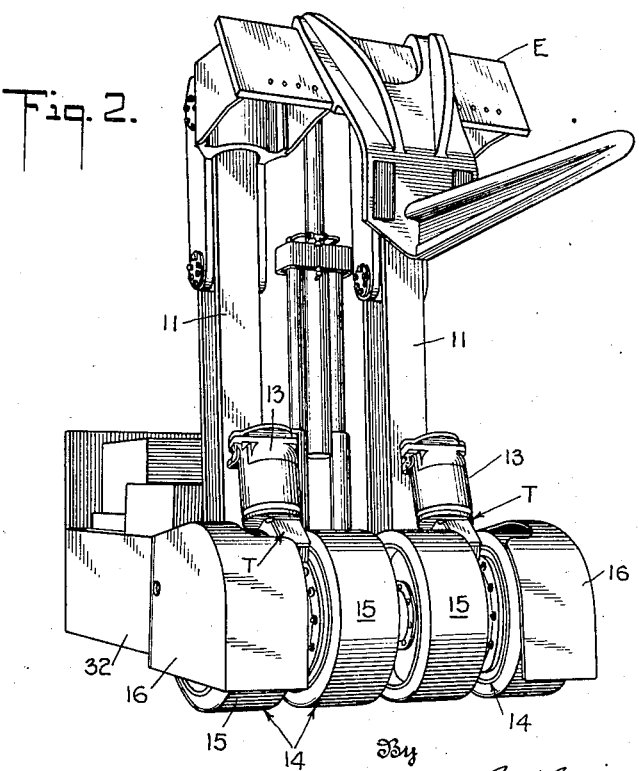

Referring now to the drawings, Fig. 1 is a perspective view of a truck showing my invention embodied therein. Fig. 2 is a view similar to Fig. 1 but showing the elevating carriage of the truck in a raised position. Fig. 3 is an elevation of the forward end of the truck shown in Figs. 1 and 2. Figs. 4 and 5 are figures taken respectively along lines 4—4 and 5—5 of Fig. 3.

Referring now more particularly to the drawings, the truck of my invention comprises the usual main frame formed through the welding of a series of structural members. In the particular case here, the main frame comprises a U-shaped transverse structural member 10 to which are welded uprights 11 on which the elevating carriage E is adapted to move vertically from the position of Fig. 2 to the position of Fig. 1. Welded to the forward surfaces of the two uprights 11 is what I call a front plate 12 that thus extends transversely across the truck. A pair of power traction units is utilized for driving the truck, each of these units being designated generally by the letter T and each comprising a motor 13 and a pair of drive wheels 14, there being thus four driving wheels for the truck positioned across the forward end thereof. In my earlier application, I describe more particularly the traction units T and the manner in which they are mounted on the truck front plate 12. For the purpose of understanding the present invention it is merely necessary to know that there are four driving wheels 14 and that each is equipped with a sleeve-like rubber tire 15 having a relatively even cylindrical surface to which may be applied the brake lining hereinafter to be set forth in detail.

My truck utilizes a pair of fenders, one at the right hand side of the truck and one at the left hand side. These fenders are similar in operation and construction, except that they are at the opposed sides of the truck, and for that reason I shall describe only the fender at one side of the truck.

This fender is designated generally by the reference numeral 16, and is shaped as is clearly shown in Figs. 1, 2 and 3 so as to overlie one of the wheels 14 and to lie closely to the tire 15 of the said wheel. Brake lining 17 is applied to the inner surface of the fender 16, as best shown in Fig. 3, so that upon movement of the fender to the left in Fig. 3 the brake lining will be applied to the tire 15. For supporting the fender in position it has welded thereto upper and lower ears 18 pivoted through a pin 19 to a link 20 as best shown in Fig. 5. The link 20 is in turn pivoted by a pin 21 to the front plate 12 through ears 18a welded to plate 12.

For guiding the fender 16 and limiting its movement on the mounting means just described, I utilize a guide bracket 22 best illustrated in Fig. 4, this guide bracket having a laterally extending bolt portion 23 whereby through a nut 24 it is secured to the fender 16 for movement integrally therewith. A bore 25 is formed in the guide bracket 22 and traversing this bore is a bolt 26 having a head 27 applied to the vertical portion 10a of the U member 10. A spring 28 surrounds the bolt 26 and presses at one end against the bracket 22 and at its other end against a nut 29 threaded onto the bolt 26, the spring operating against the nut through a washer 30. It will now be obvious that the effect of the spring 28 is to press the guide bracket 22 firmly against the part 10a of the U member 10 so as to maintain the fender 16 in its position of Fig. 4. Fender 16 is of course free to move against the force of the spring 28 carrying with it bracket 22. This movement will be limited by the size of a hole 31 cut in a plate 32 welded to the U member 10, and forming part of the main frame of the truck. If desired, a further bolt 33 may be secured to the fender 16 for sliding in a guide opening 34 in the plate 32.

It will now be obvious that should the truck move against an obstruction, the fender will be moved by the obstruction against the pressure of spring 28 so as to carry the brake lining 17 against the tire 15. Fender 16 will be well supported and guided for this movement, and will apply the brake lining evenly and effectively. This will effect swift braking of the truck and will stop its motion immediately. My assignee has manufactured a number of trucks constructed in accordance with the teachings of my invention herein set forth, and the braking action of the fenders, as contemplated by me, has contributed greatly to the safety and efficient operation of the trucks.

I now claim:

1. In a truck of the class described, a main frame, wheels mounted at one end of said main frame, a fender for said wheels at each side of the truck, a link swingingly mounting each of said fenders for swinging movement on a vertical axis relatively to said main frame, guide means spaced from said links for guiding said fenders in their swinging movement, springs pressing said fenders away from said wheels, and the said fenders being movable against the pressure of said spring means to bring surfaces thereof into braking relation to said wheels.

2. In a truck of the class described, a main frame, wheels mounted at one end of said main frame, a fender for said wheels at each side of the truck, a link for movably supporting each of said fenders on said main frame, means pivoting each fender to one end of one of said links on a substantially vertical axis, means pivoting the other end of each of said links to the main frame also on a vertical axis, guide means spaced from said links for guiding said fenders in their swinging movement, springs pressing said fenders away from said wheels, and the said fenders being movable against the pressure of said spring means to bring surfaces thereof into braking relation to said wheels.

3. In a truck of the class described, a main frame, wheels mounted at one end of said main frame, a fender for said wheels at each side of the truck, a link for movably supporting each of said fenders on said main frame, means pivoting each fender to one end of one of said links on a substantially vertical pivot, means pivoting the other end of each of said links to the main frame also on a substantially vertical pivot, a guide bracket secured to each of said fenders, a spring means pressing each of said guide brackets to a limit position in which said fenders are away from said wheels, and the said fenders being movable against the pressure of said spring means to bring surfaces thereof into braking relation to said wheels.

4. In a truck of the class described, a main frame, wheels mounted at one end of said main frame, a fender for said wheels at each side of the truck, a link for movably supporting each of said fenders on said main frame, means pivoting each fender to one end of one of said links on a substantially vertical pivot, means pivoting the other end of each of said links to the main frame also on a substantially vertical pivot, a guide bracket secured to each of said fenders, a bolt traversing each of said brackets and a surface of said main frame, a spring surrounding each of said bolts with one end of each spring pressing one of said brackets against the main frame in a direction to maintain said fenders away from said wheels, the other end of each spring maintaining said bolt in position against the main frame, and the said fenders being movable against the pressure of said spring means to bring surfaces thereof into braking relation to said wheels.

BRONISLAUS I. ULINSKI.

REFERENCES CITED

The following references are of record in the file of this patent:

UNITED STATES PATENTS

| Number | Name | Date |
|---|---|---|
| 1,157,460 | Throckmorton | Oct. 19, 1915 |
| 1,176,573 | Lample | Mar. 21, 1916 |
| 1,816,005 | Colombo | July 28, 1931 |
| 2,142,328 | Mutter | Jan. 3, 1939 |